United States Patent [19]

Doniger et al.

[11] 4,410,948

[45] Oct. 18, 1983

[54] MULTI-ENGINE AUTOTHROTTLE PROVIDING AUTOMATIC ENGINE EPR EQUALIZATION

[75] Inventors: Jerry Doniger; Albert T. Kirchhein, both of Montvale, N.J.

[73] Assignee: The Bendix Corporation, Teterboro, N.J.

[21] Appl. No.: 234,141

[22] Filed: Feb. 13, 1981

[51] Int. Cl.³ .................. G06F 15/46; F02K 3/00; G05B 13/02

[52] U.S. Cl. .................. 364/431.01; 364/148; 364/431.07; 364/431.02

[58] Field of Search .............. 364/424, 431.01, 431.02, 364/442, 148, 158, 431.07

[56] References Cited

U.S. PATENT DOCUMENTS

| | | | |
|---|---|---|---|
| 3,538,760 | 11/1970 | Atkey et al. | 364/431.02 X |
| 3,686,485 | 8/1972 | Wiley et al. | 364/431.01 |
| 4,032,757 | 6/1977 | Eccles | 364/431.02 |
| 4,038,526 | 7/1977 | Eccles et al. | 364/158 |
| 4,313,167 | 1/1982 | Brown | 364/431.02 |
| 4,325,123 | 4/1982 | Graham et al. | 364/442 X |

Primary Examiner—Felix D. Gruber
Attorney, Agent, or Firm—Anthony F. Cuoco; Thomas L. Adams

[57] ABSTRACT

A throttle controller for a vehicle, such as an aircraft, having a plurality of engines (36–42). Each engine is regulated by a throttle. The controller includes a thrust sensor (44), a speed sensor (IAS), and an actuator (10). The thrust sensor (44) responds to the engines (36–42) to produce a plurality of thrust signals (22). These thrust signals correspond to the thrust produced by a different corresponding one of the engines. The speed sensor (IAS) can produce a speed signal corresponding to aircraft speed. The actuator (10) can adjust the throttle of each engine. The actuator is connected to the speed (IAS) and thrust sensors (44) and can respond to their signals to adjust each throttle and balance the thrust of the engines.

17 Claims, 4 Drawing Figures

MULTI-ENGINE AUTOTHROTTLE PROVIDING AUTOMATIC ENGINE EPR EQUALIZATION

BACKGROUND OF THE INVENTION

The present invention relates to automatic throttle controllers and, in particular, to controllers which balance the thrust among a group of engines in a vehicle having a plurality of engines such as an aircraft.

It is known that a pilot of such an aircraft ought to adjust the throttle of each of the engines to balance them. Thrust imbalance requires a compensating rudder adjustment or other yaw compensation which tends to increase the aircraft drag. It is known to have an automatic throttle in an aircraft which can regulate the throttle and maintain a predetermined speed. It is also known to set aircraft speed to produce either a maximum range or a maximum endurance or flight time.

A disadvantage of aircraft having a plurality of engines is that the Pilot must manually adjust the several engine throttles to keep them in balance by observing thrust indicators such as a turbine tachometer or an engine pressure ratio meter (EPR). Such manual adjustments are time consuming and distract the pilot from other duties.

Accordingly, there is a need for a simple system for automatically balancing engine thrust while providing other functions such as speed control.

SUMMARY OF THE INVENTION

In accordance with the illustrative embodiment demonstrating features and advantages of the present invention, there is provided a throttle controller for an aircraft having a plurality of engines, each controlled by a throttle. The throttle controller has a thrust sensing means, a speed sensing means and an actuation means. The thrust sensing means responds to the engines to produce a plurality of thrust signals. Each thrust signal corresponds to the thrust produced by a different corresponding one of the engines. The speed sensing means can produce a speed signal corresponding to the speed of the aircraft. The actuation means can adjust the throttle of each of the engines. The actuation means is connected to the speed and thrust sensing means and is responsive to the speed and thrust signals to adjust each throttle. In this manner the actuation means balances the thrusts of the engines.

In an associated method of the present invention, the engines of the aircraft are throttled. The method includes the step of simultaneously throttling all of the engines to change airspeed and measuring the speed of the aircraft. Another step in the method is throttling all engines, except a selected one, in a direction to match that engine to the others in thrust.

By employing the foregoing apparatus or method, improved throttle control is accomplished. The foregoing apparatus can be arranged to adjust the throttle to regulate the speed of the aircraft while simultaneously balancing the thrust among a group of engines. Preferably, the throttle adjustments for establishing speed are accomplished more rapidly than adjustments for the purpose of balancing the engines. This timing feature enables both speed and thrust balance to be simultaneously adjusted without hunting. In a preferred embodiment, the thrust of each engine is measured (engine pressure ratio or turbine speed) and the highest measured thrust is used as a master. This master acts as a standard towards which all of the other engine thrusts are driven to achieve a balance among them. Each engine thrust is compared with a computed value of maximum limited thrust based on prescribed engine characteristics and measured altitude, airspeed, and temperature. Any engine thrust which tends to exceed the limit value forces all the engines to reduce thrust to the limit value.

It is also preferable to provide a plurality of speed commanding sources. As an example, the current speed of an aircraft may be frozen as a master speed standard so that henceforth the aircraft is throttled to continue that speed. Alternatively, the pilot may select on his instrument panel a desired speed to which the throttle is then adjusted to achieve that speed. Another speed mode can be throttling the engines to produce a speed that gives the maximum range of an aircraft per unit of fuel. This feature can be significant when it is important to conserve fuel. Alternatively, speed can be set to provide the maximum flight time as, for example, when an aircraft is circling an airport awaiting clearance to land. Another significant, optional feature is providing speed limitations to abort any commanded speed which violates a minimum speed (dependent upon airframe design). Instead, the aircraft will be directed to fly at this maximum or minimum without violating it. In one embodiment, the auto-throttle system is coupled to a radio navigation computer to calculate an airspeed that would produce a desired time of arrival at a given location. This feature can be significant where aircraft must arrive at an airport within a certain time slot consistent with other traffic.

Preferably, the thrust commanded by the present apparatus is compensated by certain other parameters to enhance stability and to achieve phugoid damping. Accordingly, the commanded thrust may be compensated by signals signifying instantaneous vertical speed, elevator position, longitudinal acceleration, etc. Also, the thrust may be gradually reduced after the aircraft descends below a preset altitude to execute a flare maneuver.

All of the foregoing functions can be effected by a throttle signal applied through a digital to analog converter to a servomotor driving the throttles of the engines.

BRIEF DESCRIPTION OF THE DRAWINGS

The above brief description as well as other features and advantages of the present invention will be moe fully appreciated by reference to the following detailed description of a presently preferred but nonetheless illustrative embodiment in accordance with the present invention when taken in conjunction with the accompanying drawings wherein.

DETAILED DESCRIPTION OF THE PREFERRED EMBODIMENT

Figure 1:
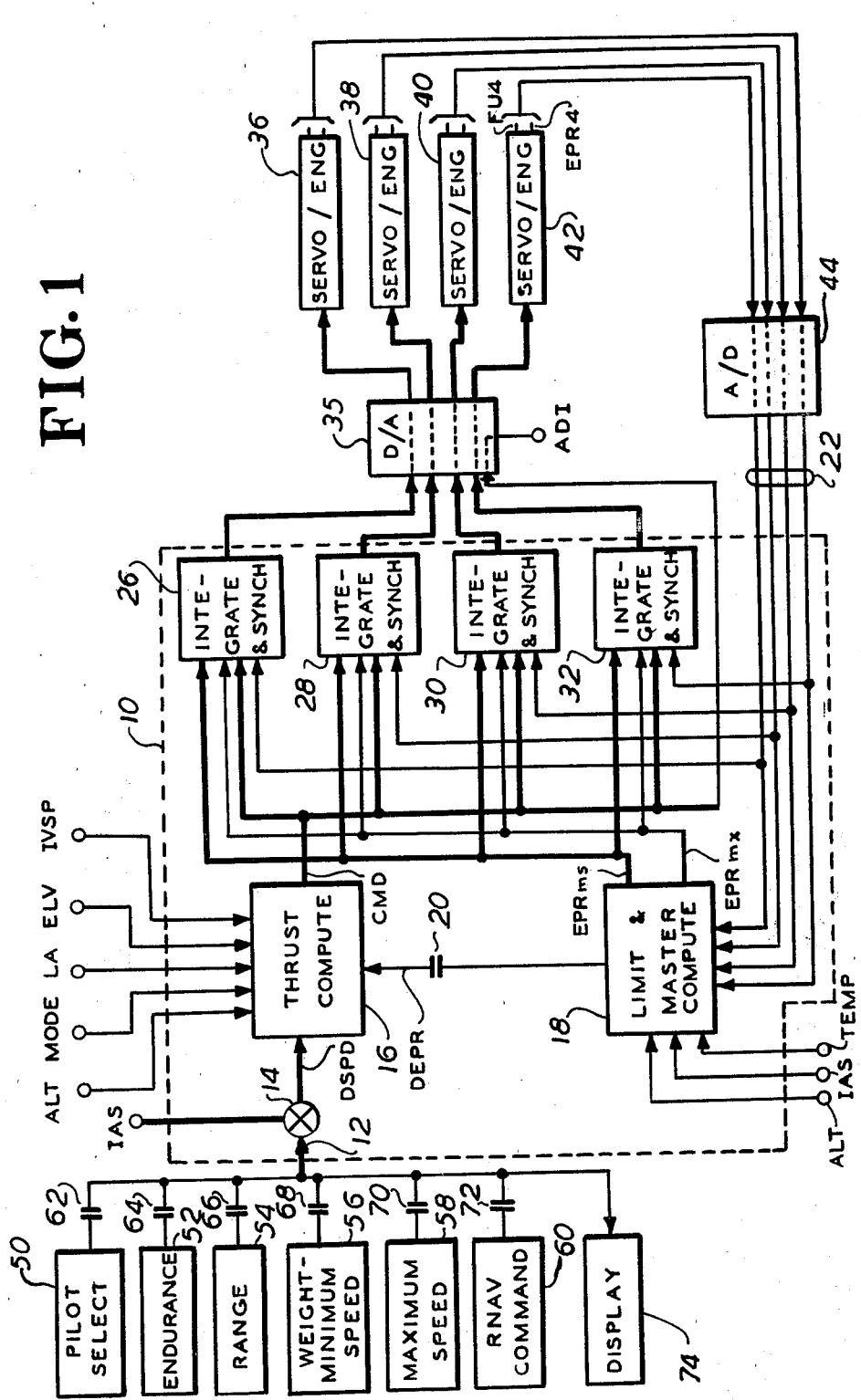
FIG. 1 is a schematic block diagram of a throttle controller according to the present invention.
Figure 2:
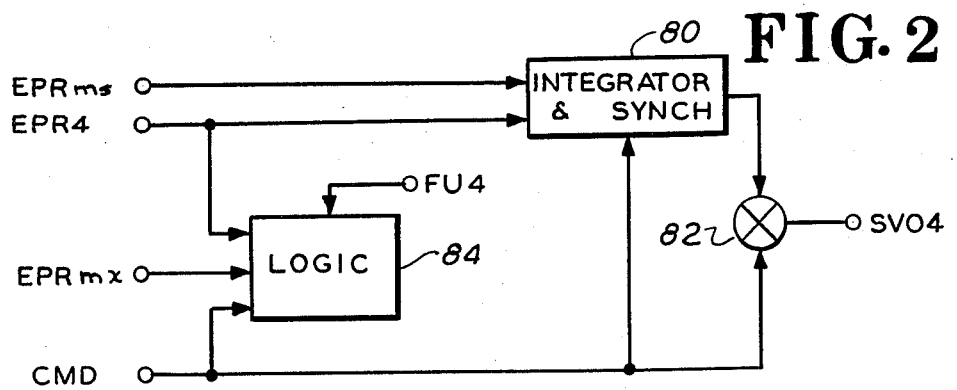
FIG. 2 is a more detailed, schematic, block diagram of the integrator and synchronization blocks of the controller of FIG. 1.
Figure 3:
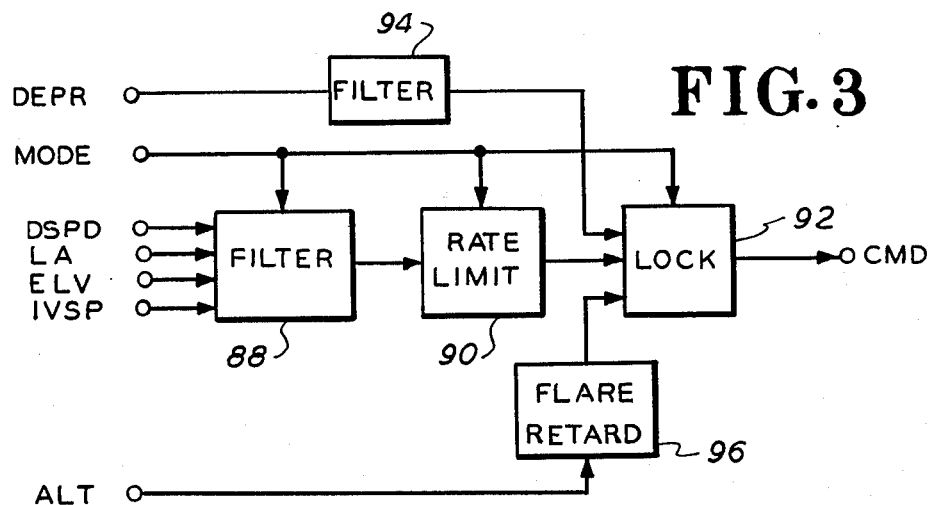
FIG. 3 is a more detailed, schematic, block diagram of the thrust computation device of the controller of FIG. 1.

Referring to FIG. 1, a throttle controller for a vehicle such as an aircraft is given. This throttle controller employs an actuation means, shown herein as computer 10. In his illustration, computer 10 is shown composed of several functional blocks and all inputs to computer 10 hereinafter mentioned are in digital form. In a preferred embodiment the functions of these blocks, as described hereinafter, are all accomplished by a suitable microcomputer and memory elements. The structure, functioning and operation of microcomputers are, of course, well known at this time and need not be explained in detail herein. In this connection it is to be understood that FIGS. 1-3 show functional elements which are representative of operations performed by a program and that the lines interconnecting the functional elements are representative of data flow.

Computer 10 receives a velocity command signal (described hereinafter) on line 12 and an actual speed signal on terminal IAS. Terminal IAS is part of a speed sensing means for indicating true aircraft speed. The data applied to terminal IAS is typically derived by an air data computer, a well-known device. The signals on line 12 and terminal IAS are applied to a differential means, shown herein as a subtractive device 14, to produce a speed error signal on line DSPD. The latter error signal is applied as an input to thrust computation device 16. Output line CMD of computation device 16 is primarily a function of the speed error signal applied by line DSPD. However, this output is modified by certain compensating signals and mode controlling signals. Thrust computing device 16 is compensated by a transducer signal signifying aircraft altitude on terminal ALT. Also, computing device 16 receives a mode controlling signal from terminal MODE. This signal indicates the type of speed control being applied through line 1 to adjust the response of thrust computing device 16, as described hereinafter. A longitudinal acceleration signal from a longitudinal accelerometer is applied to computing device 16 by terminal LA. Also, the position of an aircraft elevator is sensed by computing device 16 from a transducer signal supplied hereto from terminal ELV. Furthermore, the output signal produced by device 16 is compensated by a signal signifying instantaneous vertical speed at terminal IVSP from a vertical means such as a barometric altimeter, radio altimeter, integrated vertical accelerometer or other device. The command signal produced by device 16 on line CMD is basically an airspeed error signal for adjusting aircraft thrust until the desired speed is reached. Thrust computing device 16 also has another input line DEPR which can limit the aircraft speed so the engines are not required to produce thrust in excess of a predetermined limit. This function is provided by limit and master computing device 18 which has an output serially connected by switch 20 to line DEPR. Switch 20 is normally open but is closed by device 18 when one of the engines has reached its maximum thrust level. In a manner described hereinafter, the command signal on line CMD is thereafter regulated to drive each engine towards but not beyond its maximum thrust. Device 18 receives the following sensed signals as inputs: throttle position as well as engine thrust from transducer signals on lines 22. Using the data on lines 22 and the data on terminals ALT, IAS and TEMP (Altitude, Airspeed, and Temperature, respectively) device 18 is able to produce a maximum thrust signal on line EPRmx. It is also able to produce a differential signal on line DEPR when switch 20 is closed, signifying the difference between the maximum permissible thrust and the largest thrust produced by one of the engines. This difference signal can be used by computing device 16 to override the speed commands on line DSPD when they command a speed that will overstress the engines. Computing device 18 also provides on line EPRms a master signal which, preferably, is the thrust signal from the engine producing the highest thrust. This feature is significant since from the other engines can then be balanced against the engine producing the greatest thrust so that no engine inadvertently exceeds its thrust limitation.

The thrust signal on line EPRms is commonly applied to each of a plurality of integrator means shown herein as integrate and synchronization devices 26, 28, 30 and 32. Each of the devices 26–32 also receives a common command signal from thrust computing device 16 on line CMD. Devices 26–32 also receive as sensed signals, thrust and throttle position from data on lines 22, each being connected to a corresponding one of devices 26–32. Also connected as an input to devices 26–32 is the output line EPRmx of computing device 18. Devices 26–32 balance the engines by responding to the speed error signal on line CMD and to a thrust error derived from the master thrust signal on line EPRms against the measured thrusts on lines 22.

The outputs of devices 26–32 comprise combined speed and thrust error signals that are applied to a multiplexing, digital to analog converter 35 which converts digital data from actuator 10 into an analog form and applies it to the engines, shown herein as four throttled engines 36, 38, 40 and 42. Each of the engines 36–42 has associated with it a servomotor operating in a position feedback loop. The throttle position is sensed by a follow-up synchro-transmitter which produces a position signal on line FU4 of engine 42. A thrust signal is also transmitted on line EPR4 of engine 42. This thrust signal can be derived from turbine speed, engine pressure ratio (from input to output manifold), or any other parameter that is a measure of engine thrust. It is to be appreciated that engines 36–42 all have a similar pair of output lines such as lines FU4 and EPR4, all of which are connected to a thrust sensing means shown herein as a multiplexing, analog to digital converter 44 which returns digital data on lines 22 to actuator 10.

It will be noted that the speed error signal on line CMD is connected through digital to analog converter 35 to produce an output on terminal ADI which is used to drive the "fast/slow" indicator of the artificial horizon in the aircraft cockpit. This indicator displays whether the engine thrust needs to be increased or decreased to maintain a desired speed.

The throttle controller also includes a speed computing means shown herein as six, separate, speed computing devices 50, 52, 54, 56, 58 and 60. Each of the devices 50, 52, 54, 56, 58 and 60 can be selectively coupled to line 12 by means of selection switches 62, 64, 66, 68, 70 and 72, respectively. The six latter switches may be manually selected by the pilot to provide the specific desired speed control, as described hereinafter.

When switch 62 is manually closed by the pilot device 50 can produce a speed signal through switch 62 that is the current speed of the aircraft. That speed then becomes a fixed standard toward which the aircraft speed is driven. The device 52 can compute that speed necessary to produce the maximum time aloft. This latter feature would be important where an aircraft is circling a runway, waiting for clearance to land.

In a well understood manner device 54 calculates the speed required for the aircraft to travel the maximum distance, thereby maximizing fuel efficiency. Device 56 produces a speed signal whenever the aircraft falls below a minimum safe speed by automatically closing switch 68. The minimum safe speed signal, a factor depending upon the gross weight of the aircraft, overrides any other speed signal. Similarly, device 58 produces a maximum speed signal and automatically closes switch 70 to override any other speed signal. This feature avoids driving the aircraft to speeds in excess of its comfort or other design limits.

When switch 72 is closed by the pilot, device 60 couples itself to the radio navigation computer (not shown) to produce through switch 72 a speed signal that will allow the aircraft to arrive at a destination at a predetermined time. Basically, device 60 obtains data from the radio navigation computer and calculates the destination distance and the speed required to produce the desired arrival time. This feature is significant where traffic patterns must be maintained so that there is no bunching of aircraft over a particular flight control sector. The specific speed selected and applied to line 12 by switches 62–72 constitutes a speed command which can be displayed on a display means 74 as a numeric display on a control panel.

Referring to FIG. 2, a more detailed block schematic is given of device 32 of FIG. 1. It is to be appreciated that devices 26–30 of that figure all have a similar structure. The device of FIG. 2 includes integrator 80 for producing an output signal that is the time integral of the difference between its input signals on lnes EPRms and EPR4. The signals on line EPRms and EPR4 correspond to the previously mentioned master signal and the measured thrust on the fourth engine (engine 42 of FIG. 1) respectively. The integration performed upon the error between engine thrust and the master thrust is scaled so that the system response thereto is relatively slow. Therefore the balancing of engine thrust is gradually performed over a relatively long time interval. The output of integrator 80 is connected to one input of a subtractive device 82 whose other input is connected to the speed command signal on terminal CMD. Thus connected, the output on line SV04 is a combination of the speed error and thrust imbalance. To establish initial conditions prior to engaging the auto-throttle, the speed command signal on line CMD is applied to an input of integrator 80 to drive it to a level corresponding to the speed command signal on terminal CMD. Accordingly, the output of integrator 80 is initially balanced against the signal on terminal CMD so that when the auto-throttle is engaged, the combined error signal on line SV04 is zero initially. Afterwards line CMD does not drive device 80.

The device of FIG. 2 also includes logic circuit 84 which has as inputs the follow-up signal on previously mentioned terminal FU4, the maximum thrust signal on previously mentioned terminal EPRmx as well as the recently mentioned signals on terminals EPR4 and CMD. Consequently, logic circuit 84 can provide a warning signal should there be an attempt to command the engine thrust to exceed the predetermined maximum. In response, logic circuit 84 can override the speed command signal on terminal CMD and regulate the output on terminal SV04 to keep thrust at the maximum.

Referring to FIG. 3, a more detailed block schematic is given of the thrust computing device 16 of FIG. 1. Its previously mentioned input terminals are again illustrated herein. The computing device of FIG. 3 is shown comprising filter 88 for receiving the speed error signal on terminal DSPD. The previously mentioned compensating factors are applied on filter 88 on its input terminals LA, ELV and IVSP (longitudinal acceleration, elevator position and vertical speed, respectively) to correct the commanded speed error for transient disturbances. These compensating parameters are linearly combined with the speed error signal of terminal DSPD in a conventional manner to enhance the control stability. The output of filter 88 is connected to a rate limiter 90 to limit the rate of change from filter 88 so that it does not command an unusually large transient. The output from rate limiter 90 is applied to lock device 92, which is essentially a device for selecting alternative controlling signals. Another input which may be selected by locking device 92 is the output of filter 94 which receives a thrust error signal on terminal DEPR. This signal is selected when the speed command would require thrust in excess of the maximum permitted. When this occurs, the engine is controlled to produce the maximum permitted thrust as indicated by the thrust error on terminal DEPR. Another input to locking device 92 is a flare retard means shown herein as a flare retarding coupler 96. Device 96 essentially produces a linearly decreasing speed command when the altitude of the aircraft, as sensed by terminal ALT (an input to device 96) indicates altitude so low that a flaring maneuver is appropriate. The particular mode selected by locking device 92 is controlled by a manually derived signal on terminal MODE. This mode control signal is also applied to filter 88 and limit 90 to regulate their manner of operation.

Figure 4:
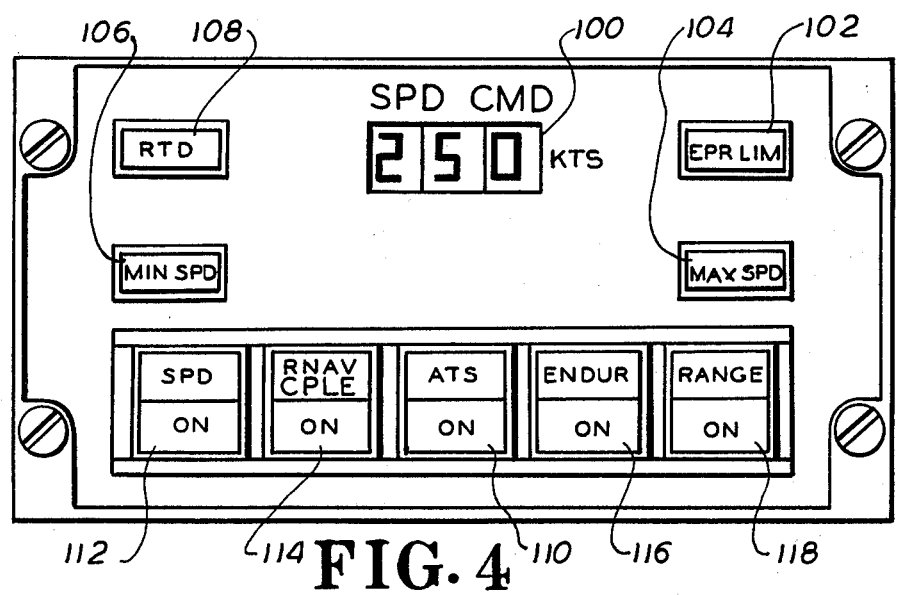
FIG. 4 is a plan view of a control panel for the controller of FIG. 1.

Referring to FIG. 4, a control and display panel is illustrated which is part of elements 62–74 of FIG. 1. Display 74 of FIG. 1 is shown herein as seven segment numeric display 100. Four annunciators are provided: annunciator 102 indicating that the engine is being regulated to attain its maximum thrust; annunciator 104 indicating the engines are being regulated to attain the maximum speed; annunciator 106 indicating the engines are being regulated to produce the minimum speed; and annunciator 108 indicating that the throttle is being gradually retarded during a flare maneuver to produce a controlled descent.

The auto-throttle system can be engaged by depressing switch 110 to balance the thrust among the aircraft engines and to fly at a speed set by the pilot on another speed indicator (not shown). Depressing switch 112 causes the aircraft to continue flying the current speed. Depressing switch 114 causes speed control to be transferred to a radio navigation computer. Depressing switch 116 causes the airfraft speed to be held at a speed producing the longest flight time, as may be desirable during a holding pattern. Depressing switch 118 causes an aircraft speed producing the greatest range as may be desirable when fuel efficiency is most important. Switches 110–118 are alternately closed and opened by successive depressions.

To facilitate an understanding of the principles associated with the foregoing apparatus, its operation will be briefly described. Prior to engaging the auto-throttle system by one of the switches 110–118 of FIG. 4, the integrators in devices 26-32 (for example integrator 80 of FIG. 2) are driven to a level which balances out the signal on line CMD so that the outputs of devices 26-32 (FIG. 1) are initially zero. Accordingly, when the auto-throttle system is engaged there will not be a rapid transient adjustment of the throttles. After engagement, integrators such as integrator 80 will not be influenced by the input from terminal CMD.

It will be assumed initially that switch 110 (FIG. 4) is engaged so that switch 62 (FIG. 1) is closed and applies to line 12 that speed command signal manually selected by the pilot. This commanded signal is compared by subtractive device 14 to the airspeed derived by the air data computer (not shown) as indicated on terminal IAS. The speed error produced on line DSPD is applied to computing device 16, whose filter 88 and limiter 90 (FIG. 3) filters the signal and stabilizes it with the compensating signals on terminals LA, ELV and IVSP to produce a rate limited signal on the output of limiter 90. The mode signal on terminal MODE (FIG. 3) causes lock 92 to couple through to terminal CMD the output of limiter 90. The speed error signal thus derived and applied to line CMD drives each of the integrator-synchronizers 26-32 (FIG. 1) to produce from each, combined error signals. These errors signals from devices 26-32 are influenced by the master thrust signal on line EPRms, a signal as previously mentioned, corresponding to the thrust from the engine producing the greatest thrust. Also, as previously mentioned, this master signal is compared by devices 26-32 to the actual thrust (for example the signal of line EPR4) to drive an integrator such as intergrator 80 (FIG. 2). An imbalance in thrust can thereby produce a slowly varying correction signal which is transferred through differential device 82 to output line SVO4. As a result, the engine thrust is eventually balanced on a long term basis. It is to be noted that the speed corrections (signals of line CMD of FIG. 1) are performed more quickly then the thrust balancing correction (signals of lines 22 of FIG. 1) so that both speed regulation and thrust balancing can be simultaneously performed without conflict. These combined signals are conveyed through digital to analog converter 35 to engines 36-42 to balance them and regulate speed.

Asume now that the pilot readjusts his desired speed so that device 50 now commands a greater speed than permissible. Accordingy, device 58 senses this excessive speed and causes its switch 70 to close so that the signal from device 50 is overriden. This overriding may be accomplished by either opening switch 62 or by designing device 58 as a low impedance voltage source (or equivalent) which overcomes the effect of device 50. Accordingly, the speed command applied to line 12 now corresponds to the maximum speed permissible by the aircraft. Therefore the throttles are thereafter continually adjusted to produce the maximum speed. On the other hand, the pilot could have readjusted the speed commanded by device 50 too low, thereby risking a stall. Accordingly, minimum speed device 56 would be activated and switch 68 would close, thereby overcoming the effect of device 50. Thereafter the aircraft flies at the minimum speed consistent with the aircraft gross weight.

Similarly, devices 52 and 54 and 60 can produce their own separate speed signals to control aircraft speed to the magnitude previously described.

Assume now that conditions change such that in order to acheive the commanded speed one or more the engines must be throttled to produce a thrust in excess of the permitted maximum. Accordingly, a relatively large thrust signal will be indicated on one of the lines such as lines EPR4 (FIG. 1). This thrust signal will be conveyed through analog to digital converter 44 to integrating device 32. Referring to FIG. 2, it will be observed that the thrust on line EPR4 is compared to the maximum thrust indicated on line EPRmx by logic device 84. Logic device 84 responds by lighting annunciator 102 (FIG. 4) to cause control of the auto-throttle to be automatically transferred to filter 94 (FIG. 3). This latter transfer is accomplished through lock 92, which thereafter ignores the output of limiter 90. Thus control is being effected through line DEPR, a line carrying an error signal for engine thrust with respect to the maximum permitted engine thrust. Each engine is in this manner kept at maximum thrust.

Assume now that the aircraft is descending and approaches an altitude of 50 feet, for example. This altitude is sensed on line ALT (FIG. 3) to engage flare retard device 96. Device 96 conveys as overriding signal to locking device 92 to cause its output to linearly decrease in time. Consequently, the signal on line CMD gradually declines causing the aircraft to lose altitude gradually and thus accomplish a flare maneuver. The retarding condition is indicated by annunciator 108 (FIG. 4).

It is to be appreciated that various modifications may be implemented with respect to the above described preferred embodiment. For example, various analog devices may be substituted for digital devices previously described. Furthermore, alternate or supplemental compensating factors may be combined with the speed error signal to compensate for transients and enhance stability to atmospheric disturbances, etc. In addition, numerous mechanical arrangements may be employed to adjust the throttle of the various engines. Such devices may use velocity position or other forms of feedback around a servomotor. It is also to be appreciated that the type and number of engines being controlled can be readily varied. While several specific speed control standards are illustrated, it is to be appreciated that other speed control standards may be employed and some embodiments may not employ all of the speed control standards. Morevoer, the various operational parameters sensed herein, such as speed, acceleration and altitude, may be sensed by various other transducers. Also, pairs of transducers may be used in a complementary fashion to reduce the overall noise produced by any one transducer. Further, the number of parameters displayed, the type of annunciators employed and the other visual devices used may be modified or deleted, depending upon the human engineering considerations. Also, since certain speed control commands are inconsistent or take precedence, they can automatically disengage earlier engaged speed control functions. It is also anticipated that numerous circuit modifications may be implemented to satisfy the desired speed, power, capacity, etc.

Obviously, many modification and variations of the present invention are possible in light of the above teachings. It is therefore to be understood that within the scope of the appended claims, the invention may be practiced otherwise than as specifically described. For example, alternatively, instead of a microcomputer the various components and functions within computer 10 can be performed with discrete circuits, such as integrators, differential amplifiers, scaling circuits, capacitive storage devices, etc. This latter alternative would result in an actual

What is claimed is:

1. A throttle controller for a vehicle having a plurality of engines, each regulated by a throttle, characterized by:
   thrust sensing means responsive to said engines for providing a plurality of thrust signals, each corresponding to the thrust produced by a different corresponding one of said engines;
   speed sensing means for providing a speed signal corresponding to the speed of said vehicle; and
   actuation means for adjusting the throttle of each of said engines, said actuation means being connected to said speed and said thrust sensing means and being responsive to said speed and thrust signals to adjust each throttle to balance the thrusts of said engines, said actuation means being responsive to that one of the engines producing the greatest of said thrust signals by adjusting the throttle of each of the other engines in a direction to equalize substantially said thrust signals.

2. A throttle controller according to claim 1, wherein said actuation means is operable to regulate the throttle of each of said engines to simultaneously balance the thrusts of said engines and drive said speed signal toward a predetermined magnitude.

3. A throttle controller according to claim 2 wherein said actuation means is operable to moderate the adjustment of the throttle of each engine to limit the magnitude of each of said thrust signals to a given maximum.

4. A throttle controller according to claim 2 including:
   speed computing means connected to said actuation means for providing thereto a velocity command signal, said actuation means being operable to alter said predetermined magnitude as a function of said velocity command signal.

5. A throttle controller according to claim 4 wherein said speed computing means produces said velocity command signal at a magnitude corresponding to a speed of the vehicle producing the greatest vehicle range.

6. A throttle controller according to claim 4 wherein said speed computing means produces said velocity command signal at a magnitude corresponding to a speed of the vehicle producing the least fuel consumption by said engines as said vehicle moves.

7. A throttle controller according to claim 4 wherein said vehicle is an aircraft and wherein the speed computing means comprises a radio navigation computer responsive to external radio signals, said speed computing means being operable to produce said velocity command signal at a magnitude corresponding to a predetermined transit time between two predetermined locations.

8. A throttle controller according to claim 4, wherein said speed computing means is operable to limit said velocity command signal to a predeterined maximum.

9. A throttle controller according to claim 4 wherein said speed computing means is operable to limit said velocity command signal to a predetermined minimum.

10. A throttle controller according to claim 4 wherein:
    the actuation means provides a signal signifying the difference between said velocity command signal and said speed signal.

11. A throttle controller according to claim 4 including:
    display means connected to said speed computing mean for displaying an indication of the magnitude of said velocity command signal.

12. A throttle controller according to claim 2 wherein said actuation means provides a master signal signifying a convergence point for said plurality of thrust signals, said actuation means including a plurality of means, each operable to provide an integral signal signifying the time integral of the difference between said master signal and a different corresponding one of said thrust signals, each of said integrator means being derivable to an initial condition corresponding to the initial error between said speed signal and said predetermined magnitude.

13. A throttle controller according to claim 2 wherein said vehicle includes means connected to said actuation means for applying thereto a signal corresponding to the instantaneous vertical speed of said vehicle and wherein said predetermined magnitude established by said actuation means varies as a function of said signal.

14. A throttle controller according to claim 13 wherein said vehicle is an aircraft having an elevator and a longitudinal accelerometer for providing an acceleration signal corresponding to the longitudinal acceleration of said aircraft and wherein said predetermined magnitude established by said actuation means varies as a function of said acceleration signal and the position of said elevator.

15. A throttle controller according to claim 2 wherein said actuation means responds more rapidly to said speed signal than to said plurality of thrust signals.

16. A throttle controller according to claim 2 wherein said vehicle is an aircraft having an altitude sensor for providing an altitude signal signifying aircraft altitude, said actuation means further comprising:
    means connected to said altitude sensor for gradually moving the throttle of each of said engines toward an idle position in response to said altitude signal reaching a magnitude signifying altitude below a predetermined height.

17. A throttle controller according to claim 1, 2 or 4 wherein said vehicle is an aircraft.

* * * * *